(12) United States Patent
Fjerstad

(10) Patent No.: US 7,765,885 B2
(45) Date of Patent: Aug. 3, 2010

(54) GEAR DRIVE SYSTEM AND METHOD

(75) Inventor: Erik A. Fjerstad, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 584 days.

(21) Appl. No.: 11/277,547

(22) Filed: Mar. 27, 2006

(65) Prior Publication Data

US 2007/0221001 A1    Sep. 27, 2007

(51) Int. Cl.
*F16H 19/04* (2006.01)
(52) U.S. Cl. .................. 74/30; 74/424.6; 74/424.81
(58) Field of Classification Search ............. 74/89.11, 74/89.18, 89.25, 422, 30, 424.81, 424.6, 74/89.12
See application file for complete search history.

(56) References Cited

U.S. PATENT DOCUMENTS

| 27,307 | A | * | 2/1860 | Parsons ........................ 74/30 |
| 3,688,374 | A | * | 9/1972 | Goldsmith ............... 29/893.32 |
| 3,777,590 | A | | 12/1973 | Parkes et al. |
| 4,531,603 | A | | 7/1985 | VanCise, Jr. et al. |
| 5,099,714 | A | * | 3/1992 | Hutchison et al. ............. 74/422 |
| 5,351,566 | A | * | 10/1994 | Barnett .......................... 74/30 |
| 6,470,994 | B1 | * | 10/2002 | Shimizu et al. ............. 180/446 |
| 7,293,626 | B2 | * | 11/2007 | Ozsoylu et al. ............. 180/444 |

* cited by examiner

*Primary Examiner*—Thomas R Hannon
*Assistant Examiner*—Terence Boes
(74) *Attorney, Agent, or Firm*—The Noblitt Group, PLLC

(57) ABSTRACT

The disclosed system, device and method for providing a low aspect rack and pinion assembly includes a rack engaged with a ball screw and a pinion. The rack is generally responsive to the rotation of the ball screw and the pinion is generally responsive to the movement of the rack. The separating forces generated by the engagement of the rack and pinion are suitably reacted by one or more stabilizer bearings engaged with the structure of the rack and pinion to prevent the rack and pinion from disengaging while maintaining a low aspect profile.

10 Claims, 3 Drawing Sheets

GEAR DRIVE SYSTEM AND METHOD

GOVERNMENT LICENSE RIGHTS

This invention was made with United States Government support under Contract number F08630-03-C-0047 awarded by the Department of the Air Force. The United States Government has certain rights in this invention.

FIELD OF INVENTION

The present invention generally concerns gear drive systems; and more particularly, representative and exemplary embodiments of the present invention generally relate to systems, devices and methods relating to low-profile rack and pinion gear arrangements.

BACKGROUND OF INVENTION

Gear drives are used in a wide variety of applications to perform a number of different functions. In some applications, for example, gear drives may be used to change rotational direction and alter rotational speed in a mechanical system. One common application of a gear drive system is a rack and pinion gear system, which converts rotation to linear motion. However, in order for the rack and pinion gears to remain engaged with each other, such systems must typically react to the gear-mesh separation force generated by the meshing of the gear teeth on the rack and pinion gears. Many conventional systems include additional structures that react to the separation force, but which also increase the size of the gear systems, which converts rotary motion to linear motion and vice versa.

There is a need, not met in the conventional art, of a method and apparatus for a rack and pinion gear system that does not require additional, outside structures to counter reaction to the separation forces created through operation of the rack and pinion gear system.

SUMMARY OF THE INVENTION

In various representative aspects, the present invention provides a low-profile gear drive system, device and method. Exemplary features generally include a rack engaged with a pinion. The pinion is generally responsive to the movement of the rack. The separating forces generated by the engagement of the rack and pinion are suitably reacted by one or more stabilizer bearings engaged with the structure of the rack and pinion to prevent the rack and pinion from disengaging.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the Description and/or in the claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any gear drive system. Certain representative implementations may include, for example, missile fin controls. As used herein, the terms "rack", "pinion", "gear" or any variation or combination thereof, are generally intended to include anything that may be characterized as elements of a gear and/or gear system.

A detailed description of an exemplary application, namely a low-profile rack and pinion gear system, is provided as a specific enabling disclosure that may be generalized to any application of the disclosed system, device and method for a gear drive in accordance with various embodiments of the present invention.

Figure 1:
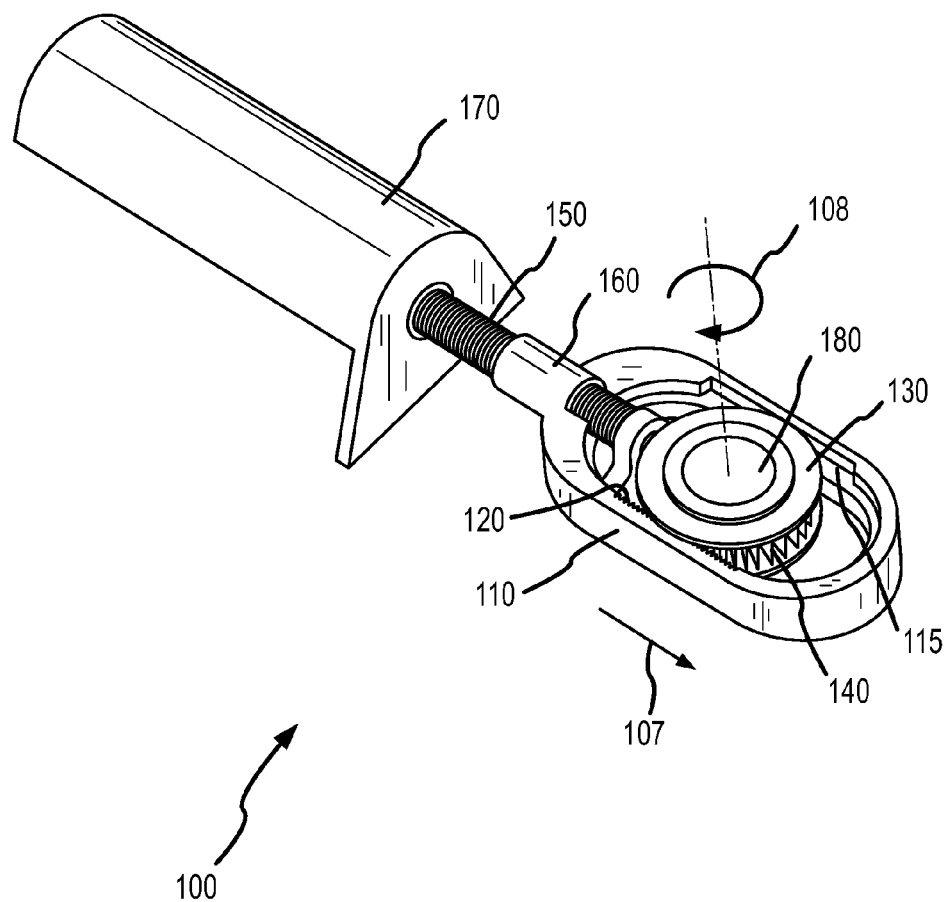
FIG. 1 representatively illustrates an isometric view of a gear drive system in accordance with an exemplary embodiment of the present invention.

FIG. 1 representatively illustrates an isometric view of a gear drive system 100 in accordance with an exemplary embodiment of the present invention. Gear drive system 100 may include a rack 110 having an inner surface 115 with a rack gear 120 disposed on one side of the inner surface 115. Rack gear 120 may be engaged with a pinion 130 having a pinion gear 140. In this exemplary embodiment, a ball screw 150 may be engaged both with the ball nut 160 of the rack 110 and with a motor 170. The motor 170 may rotate the ball screw 150, and the engagement of the ball nut 160 with the ball screw 150 may move the rack 110 with a linear motion 107 along the length of ball screw 150. The linear motion 107 of the rack may impart a rotational motion 108 to the pinion 130 as the pinion gear 140 and the rack gear 120 engage. An output shaft 180 may be coupled to pinion 130. Output shaft 180 may be coupled to impart a torque to an external device, structure, assembly, and/or the like. The gear drive system 100 shown may be used for any purpose where linear motion 107 may be translated to rotational motion 108 or where rotational motion 108 may be translated to linear motion 107.

Rack 110 may interface with pinion 130 in any suitable manner. For example, the pinion 130 may be disposed within the structure of the rack 110 and the pinion 130 may rotate in response to the movement of rack 110. Rack 110 may include any appropriate system, structure, and/or device to engage pinion 130. In the present exemplary embodiment, rack 110 may include a rack gear 120 which comprises gear teeth partially along a portion of the inner surface 115 of one side of the rack 110. Also, pinion 130 may include a pinion gear 140 comprising gear teeth at least partially along the outer surface of pinion 130. Rack gear 120 suitably meshes with the pinion gear 140 of pinion 130 such that pinion 130 rotates as the rack 110 moves. Pinion 130 may interface with any other suitable structures, devices, and/or systems in any configuration and in any suitable manner. For example, pinion 130 may interface with output shaft 180 to operate the fin of a missile.

The rack 110 may be of any suitable size, shape, geometry and symmetry to achieve any purpose. In the present exemplary embodiment, the gear drive system 100 is configured to provide a low profile for use in controlling the fins of a missile. The gear drive system 100 at least partially limits its profile by disposing the pinion 130 within the structure of the rack 110. In this exemplary embodiment, referring now to FIG. 2, the structure of the rack 110 also generally allows the stabilizer bearing 210 to engage with the rack 110 to counteract the separating forces generated by the engagement of the rack gear 120 and the pinion gear 140.

Ball nut 160 may be configured in any suitable manner to interface with ball screw 150, such as including a threaded surface suitably adapted to engage the threads on ball screw 150. Ball nut 160 may comprise any other structure, system and/or device that may be suitably configured to permit rack 110 to engage ball screw 150. Ball screw 150 may interface with any suitable system, such as motor 170. In the present exemplary embodiment, motor 170 may drive ball screw 150 to cause rack 110 to move along the length of ball screw 150. Motor 170 may comprise any suitable structure, system and/or device suitably adapted to move the ball screw 150, such as an electric motor, or any other drive mechanism, whether now known or subsequently described in the art.

Rack 110 may be of any suitable size, shape, geometry and/or symmetry to achieve any purpose. In the present exemplary embodiment, gear drive system 100 may be configured to provide a low profile for use in controlling, for example, the fins of a missile. Gear drive system 100 may at least partially limit its profile with the disposition of pinion 130 substantially within the structure of rack 110.

Figure 2:
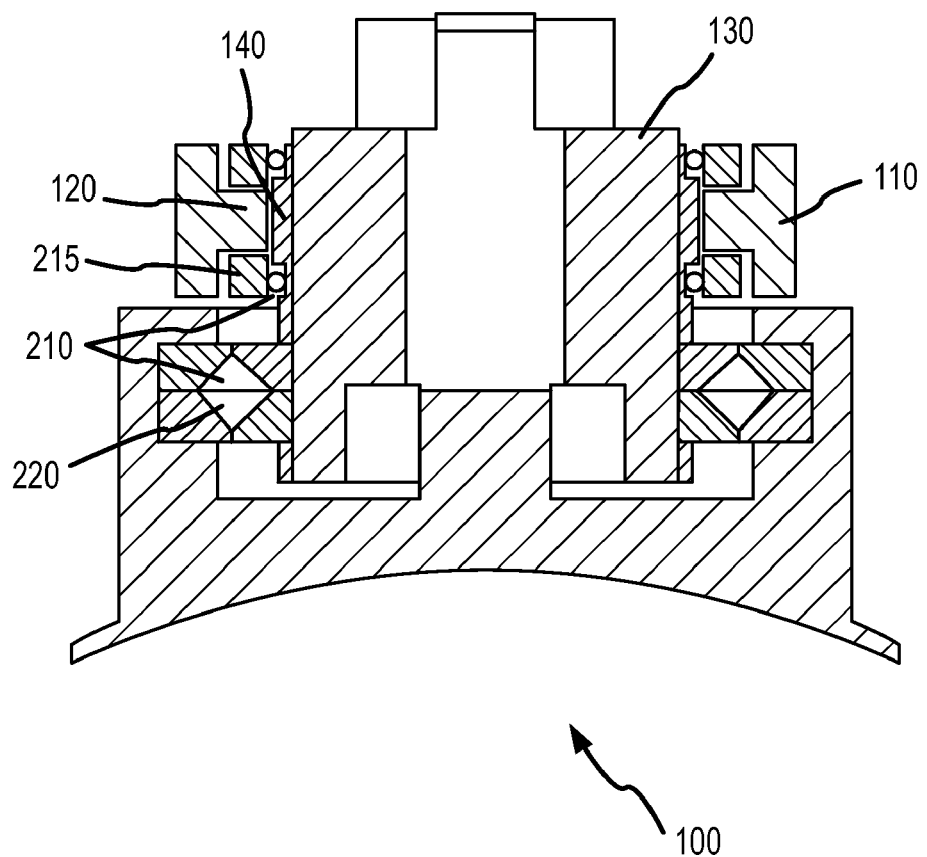
FIG. 2 representatively illustrates a side cross-sectional view of a gear drive system in accordance with an exemplary embodiment of the present invention.

FIG. 2 representatively illustrates a side cross-sectional view of a gear drive system 100 in accordance with an exemplary embodiment of the present invention. In a representative embodiment, at least one stabilizer bearing 210 may engage the structure of rack 110 in any suitable manner to substantially react to the separating forces generated by engagement of rack gear 120 and pinion gear 140 in order to prevent or otherwise obstruct rack gear 120 and pinion gear 140 from disengaging. Stabilizer bearing 210 may interface with any other suitable structures, systems, and/or devices to suitably respond to any forces generated inside or outside the gear drive system 100. In the present exemplary embodiment, rack gear 120 and pinion gear 140 may be adapted to substantially mesh on one side of rack 110 via rack gear 120 and pinion gear 140. Stabilizer bearing 210 may suitably engage with rack 110 on the opposite side of rack 110 from rack gear 120 to react to the separating force generated by engagement of rack gear 120 and pinion gear 140, in order to substantially prevent or otherwise obstruct rack gear 120 and pinion gear 140 from disengaging. Stabilizer bearing 210 may comprise means for redirecting gear separation load back to pinion gear 140 via rack 110 directly. This allows the rack to maintain a relatively small aspect ratio without outboard bearing arrangements that typically increase the sectional area of gear drive system 100.

Stabilizer bearing 210 may comprise any suitable structures, devices and/or systems in any configuration. In the present embodiment, for example, stabilizer bearing 210 may comprise at least one of a cross roller bearing 220 and a ball bearing 215. Stabilizer bearing 210 may be used in the gear drive system 100 to achieve any other suitable purpose, such as maintaining the alignment of rack gear 120 and pinion gear 140. Stabilizer bearing 210 may be used to provide an appropriate amount of stiffness against axial and lateral loads, as well as bending moments that may be generated by operation of the gear drive system 100. Stabilizer bearing 210 may be used to react to multiple load vectors for any suitable purpose, such as to reduce the number of stabilizer bearings 210 in a gear drive system 100 and allow gear drive system 100 to be implemented with fewer parts, allowing a low-cost and low-profile packaging arrangement.

A ball bearing 215 is a common type of rolling-element bearing. Ball bearing 215 may comprise a bearing assembly in which a surface moves upon loose hardened steel balls that roll easily in a cage. In ball bearings, the friction of sliding motion is minimized through the use of a low-friction rolling motion. An array of spherical balls may be held between V-grooves or rails with a cage that prevents adjacent balls from touching one another. To minimize wobble, the rails may be forcefully preloaded to apply pressure uniformly along the bearing.

Ball bearings 215 may support both axial and radial loads and may tolerate some misalignment of the inner and outer races. Also, balls in ball bearings 215 are relatively easy to manufacture, compared to other kinds of rolling elements. Ball bearings tend to have lower load capacity for their size than other kinds of rolling-element bearings. There are several common designs of ball bearings, each offering various tradeoffs.

A radial ball bearing uses axially symmetric inner and outer races that are shaped to transmit a radial load passes radially through the bearing. Most radial designs also support modest axial loads. An angular contact ball bearing uses axially asymmetric races. An angular load generally passes in a straight line through the bearing, whereas a radial load takes an oblique path that tends to separate the races axially. The angle of contact on the inner race is typically the same as that on the outer race. Angular contact bearings allow combined loads (i.e., loading in both the radial and axial directions) and the contact angle of the bearing may be matched to the relative proportions of each. The larger the contact angle (typically in the range 10 to 45 degrees), the higher the axial load supported, but the lower the radial load.

An axial ball bearing generally uses side-by-side races. An axial load is transmitted substantially directly through the bearing, while a radial load is poorly-supported (i.e., tends to separate the races), with anything other than a small radial load being likely to damage the bearing. A deep-groove radial bearing is one in which the race dimensions are close to the dimensions of the balls that run in it. Deep-groove bearings have higher load ratings for their size than shallow-groove bearings, but are also less tolerant of misalignment of the inner and outer races. A misaligned shallow-groove bearing may support a larger load than a similar deep-groove bearing with similar misalignment. Ball bearing 215 is not limited to the types of ball bearings recited vide supra and may include any type and/or size of ball bearing.

Figure 3:
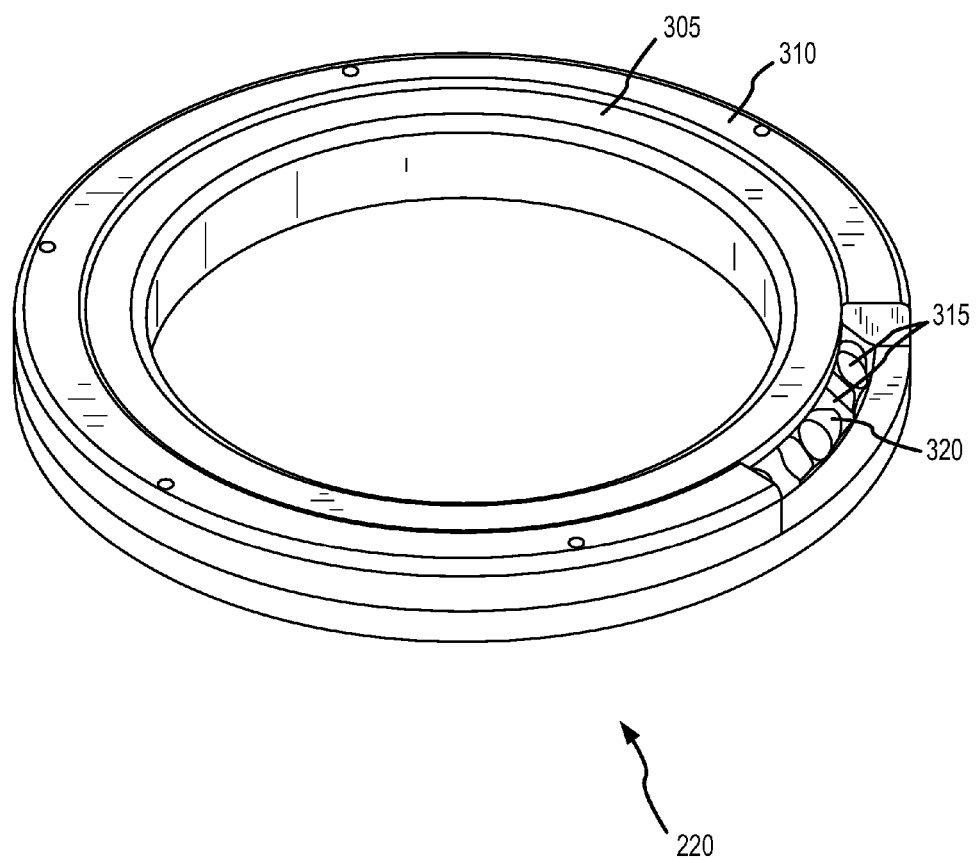
FIG. 3 representatively illustrates an isometric view of a cross-roller bearing in accordance with an exemplary embodiment of the present invention.

FIG. 3 representatively illustrates an isometric view of a cross-roller bearing 220 in accordance with an exemplary embodiment of the present invention. Cross-roller bearing 220 may comprise a bearing assembly where the bearing surface moves upon loose, hardened, cylindrical rollers 315, oriented at 90-degree angles to each other that roll freely in a cage. The cage may include an inner ring 305 and an outer ring 310. Cross-roller bearing 220 is similar to ball bearing 215 except that the balls are replaced with small steel rollers. The rollers 315 may be held apart from one another by a spacer retainer 320 to prevent adjacent rollers from touching. By having the axis of rotation alternate or cross at 90 degrees, the stage can be preloaded and will operate at any angle. Point loading of the ball bearing is changed to a line contact with the cross-roller bearing. Thus, because of the large load-bearing surfaces, crossed-roller bearings can have a higher preload applied and carry greater loads.

Stabilizer bearing 210 is not limited to cross-roller bearings and ball bearings 215, and may also comprise any other suitable bearing systems and structures. Cross-roller bearing 220 may be used to react to multiple load vectors so as to reduce the number of stabilizer bearings 210 in a gear drive system 100 and allow the gear drive system 100 to be implemented with fewer parts, thereby allowing a low-cost and low-profile packaging arrangement. Stabilizer bearing 210 may be used to allow the gear separation load to react back to the pinion gear 140 via the rack 110 directly. This allows the rack to stay small in aspect cross-section, without outboard bearing arrangements that typically increase the sectional area of gear drive system 100. The lower sectional area of gear drive system 100 makes it advantageous for uses where the cross-sectional area of a gear drive system must kept to a minimum, for example, on the outboard structure of missile to control movement, for example, of a missile fin.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprising", "having", "including" or any contextual variant thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

I claim:

1. A gear drive system, comprising:
    a rack having an inner surface comprising:
        two parallel sides;
        a first end portion connecting a first end of each of the two parallel sides together; and
        a second end portion connecting a second end of each of the two parallel sides together, wherein the second end portion comprises an opening configured to receive a drive element along a plane substantially equal to that formed by the two parallel sides;
    a rack gear disposed along only one of the two parallel sides;
    a pinion positioned within the inner surface of the rack and simultaneously engaged to the two parallel sides; and
    a pinion gear disposed around at least a portion of an outer annular surface of the pinion and configured to engage the rack gear, wherein the opening of the second end portion comprises a ball nut; and the drive element comprises a ball screw engaging the ball nut.

2. A gear drive system according to claim 1, further comprising a stabilizer bearing coupled between the rack and the pinion to operably react separating forces generated by engagement of the rack gear and the pinion gear along the two parallel sides.

3. A gear drive system according to claim 2, wherein the stabilizer bearing supports axial loading, lateral loading, and bending moments.

4. A gear drive system according to claim 2, wherein the stabilizer bearing comprises at least one of a cross-roller bearing and a ball bearing.

5. A gear drive system according to claim 1, further comprising a motor coupled to the ball screw, wherein the motor is adapted to rotate the ball screw to impart a linear motion to the rack with respect to the pinion.

6. A method of driving a shaft, comprising:
    engaging a pinion simultaneously between two opposing parallel faces of an inner surface of a rack wherein:
        a rack gear is disposed along a single opposing face of the rack; and
        a pinion gear is disposed around at least a portion of an outer annular surface of the pinion and configured to engage the rack gear;

attaching a shaft to the pinion;

inserting a drive element into an end portion of the rack; and actuating the drive element to impart a linear motion to the rack relative to the pinion, wherein the inserting the drive element to the end portion comprises threadably engaging a ball screw into a ball nut formed on the end portion of the rack.

7. A method of driving a shaft according to claim 6, further comprising coupling at least one stabilizer bearing between the rack and the pinion to react separating forces generated by engagement of the rack gear and the pinion gear along the two opposing parallel faces of a rack.

8. A method of driving a shaft according to claim 7, wherein the stabilizer bearing supports axial loading, lateral loading, and bending moments.

9. A method of driving a shaft according to claim 7, wherein the stabilizer bearing comprises at least one of a cross-roller bearing and a ball bearing.

10. A method of driving a shaft according to claim 6, further comprising rotating the ball screw with a motor coupled to the ball screw.

* * * * *